(12) United States Patent
Eberts

(10) Patent No.: US 11,097,902 B2
(45) Date of Patent: Aug. 24, 2021

(54) PIVOTING CONVEYOR

(71) Applicant: Vermeer Manufacturing Company, Pella, IA (US)

(72) Inventor: Kenneth Scott Eberts, Freeman, SD (US)

(73) Assignee: Vermeer Manufacturing Company, Pella, IA (US)

( * ) Notice: Subject to any disclaimer, the term of this patent is extended or adjusted under 35 U.S.C. 154(b) by 563 days.

(21) Appl. No.: 15/986,112

(22) Filed: May 22, 2018

(65) Prior Publication Data

US 2018/0334332 A1    Nov. 22, 2018

Related U.S. Application Data

(60) Provisional application No. 62/509,503, filed on May 22, 2017.

(51) Int. Cl.
| | | |
|---|---|---|
| *B65G 41/00* | (2006.01) | |
| *B07B 13/16* | (2006.01) | |
| *B07B 1/00* | (2006.01) | |
| *B65G 21/10* | (2006.01) | |
| *B65G 21/12* | (2006.01) | |

(52) U.S. Cl.
CPC ............ *B65G 41/002* (2013.01); *B07B 1/005* (2013.01); *B07B 13/16* (2013.01); *B65G 21/10* (2013.01); *B65G 21/12* (2013.01)

(58) Field of Classification Search
CPC ......... B07B 1/005; B07B 13/16; B65G 21/10; B65G 21/12; B65G 41/002
See application file for complete search history.

(56) References Cited

U.S. PATENT DOCUMENTS

| | | |
|---|---|---|
| 675,036 A | 5/1901 | Drake |
| 3,633,336 A | 1/1972 | Rempel |
| 3,866,889 A | 2/1975 | Maxon, III |
| 3,884,346 A | 5/1975 | O'Neill et al. |
| 4,031,976 A | 6/1977 | Lambert |
| 4,058,198 A | 11/1977 | O'Neill et al. |
| 4,135,614 A | 1/1979 | Penterman et al. |
| 4,624,357 A | 11/1986 | Oury et al. |

(Continued)

OTHER PUBLICATIONS

Schaeffler Technologies AG & Co., "Slewing Rings, Catalogue 404," issued Feb. 2012 (108 pgs).

*Primary Examiner* — Charles A Fox
*Assistant Examiner* — Kalyanavenkateshware Kumar
(74) *Attorney, Agent, or Firm* — Armstrong Teasdale LLP

(57) ABSTRACT

A material processing unit includes a main frame and a pivot assembly pivotally mounted to the frame. The pivot assembly is movable between a first pivot position, where a portion of the pivot assembly extends below the main frame, to a second pivot position, where the pivot assembly is generally above the main frame. The pivot assembly includes a mount platform that is below the main frame when the pivot assembly is in the first pivot position. The pivot assembly includes a slewing bearing mounted on the mount platform. The pivot assembly also includes a carrier mechanism that is rotatably mounted to the slewing bearing. The carrier mechanism is configured to be rotated generally parallel to the mount platform via the slewing bearing. The material processing unit includes a discharge conveyor that is pivotally mounted to the carrier mechanism.

20 Claims, 11 Drawing Sheets

(56) References Cited

U.S. PATENT DOCUMENTS

| | | | |
|---|---|---|---|
| 4,983,280 | A | 1/1991 | Eriksson |
| 5,193,971 | A | 3/1993 | Pettijohn |
| 5,577,618 | A | 11/1996 | Rafferty |
| 5,819,950 | A | 10/1998 | McCloskey |
| 6,056,252 | A | 5/2000 | Johannsen |
| 6,290,153 | B1 | 9/2001 | Prox |
| 6,543,622 | B1 | 4/2003 | Fridman |
| 6,910,586 | B2 | 6/2005 | McCloskey |
| 7,123,150 | B2 | 10/2006 | Mallett et al. |
| 7,273,150 | B2 | 9/2007 | Fridman et al. |
| 7,513,370 | B2 | 4/2009 | Fridman et al. |
| 7,891,479 | B2 | 2/2011 | Evangelista et al. |
| RE42,969 | E | 11/2011 | McCloskey |
| 9,290,337 | B2 | 3/2016 | Sheehan et al. |
| 10,683,176 | B2 * | 6/2020 | Beelman, III ............ B60P 1/38 |
| 2006/0237346 | A1 * | 10/2006 | Fridman ................ B07B 13/16 |
| | | | 209/288 |
| 2013/0277175 | A1 * | 10/2013 | Campbell .............. B65G 13/12 |
| | | | 198/586 |
| 2014/0284172 | A1 | 9/2014 | Emerson et al. |
| 2015/0336747 | A1 * | 11/2015 | Teichrob ................ B62D 11/02 |
| | | | 198/311 |
| 2016/0193610 | A1 | 7/2016 | McDevitt |
| 2016/0244268 | A1 * | 8/2016 | Ritter .................. B65G 41/002 |

* cited by examiner

PIVOTING CONVEYOR

CROSS REFERENCE TO RELATED APPLICATIONS

This Application claims priority to U.S. Provisional Application Ser. No. 62/509,503, filed May 22, 2017, the disclosure of which is hereby incorporated by reference in its entirety.

BACKGROUND

Stowable conveyor systems are useful on machines to make the machine more compact. For example, conveyors that can be stowed and deployed at will are useful on machines that are mobile, specifically those that are transported on roads.

An example of a machine on which stowable conveyor systems are commonly used is a screening machine used to process unconsolidated material that contains a variety of differently sized particulates into separate consolidated material comprising separate sizes. In some instances, rotary screening trommels that use a substantially cylindrical-shaped screening apparatus are used. These rotary screening trommels include a feed end for receiving material and a discharge end for discharging material. Rotary screening trommels operate by receiving unconsolidated material at the inlet, rotating as the material travels lengthwise through the cylindrical-shaped screening apparatus, and separating smaller material from larger material by allowing the smaller material to fall through the screening trommel during rotation. Larger material is then discharged from the discharge end of the screening trommel.

Conveyors are used to move the separated consolidated material away from the screening machine and into separate piles. It is known to stow conveyors against the screening machine when not in use. When in use, some conveyers require additional support to stabilize the conveyor due to the fact that their attachment point with the screening machine is not robust enough to handle the weight of the conveyor. Because of this, both deploying and stowing the supported conveyors is time consuming and cumbersome. Therefore, improvement in conveyor design is needed.

SUMMARY

The present disclosure relates generally to a stacking pivoting conveyor for a screening machine. In one possible configuration, and by non-limiting example, the conveyor is a radial stacking conveyor that is pivotable between first and second positions, where the conveyor is below a frame of the screening machine when in the first position and above the frame when in the second position.

In one aspect of the present disclosure, a material processing unit is disclosed. The material processing unit includes a main frame and a pivot assembly pivotally mounted to the frame. The pivot assembly is movable between a first pivot position, where a portion of the pivot assembly extends below the main frame, to a second pivot position, where the pivot assembly is generally above the main frame. The pivot assembly includes a mount platform that is below the main frame when the pivot assembly is in the first pivot position. The pivot assembly includes a slewing bearing mounted on the mount platform. The pivot assembly also includes a carrier mechanism that is rotatably mounted to the slewing bearing. The carrier mechanism is configured to be rotated generally parallel to the mount platform via the slewing bearing. The material processing unit includes a discharge conveyor that is pivotally mounted to the carrier mechanism.

In another aspect of the present disclosure, a material processing unit is disclosed. The material processing unit includes a main frame that defines a proximal frame end and a distal frame end. The material processing unit includes a collecting conveyor that is carried by the main frame. The collecting conveyor has a collecting conveyor exit that is proximate to the proximal frame end. The material processing unit includes a pivot assembly pivotally mounted to the frame. The pivot assembly is movable between a first pivot position, where a portion of the pivot assembly extends below the main frame, to a second pivot position, where the pivot assembly is generally above the main frame. The pivot assembly includes a mount platform that is positioned below the main frame when the pivot assembly is in the first pivot position. The pivot assembly also includes a swivel mount mounted on the mount platform. The material processing unit includes a non-folding discharge conveyor that is pivotally mounted to the swivel mount. The discharge conveyor is fully carried by the main frame when the pivot mount assembly is both in the first pivot position and in the second pivot position.

In another aspect of the present disclosure, a material processing unit is disclosed. The material processing unit includes a main frame and a rotary trommel screen that has an inlet end and an outlet end. The rotary trommel screen is rotatably attached to the main frame. The material processing unit includes a collecting conveyor that is positioned under the rotary trommel screen. The collecting conveyor is configured to move product away from underneath the rotary trommel screen. The material processing unit includes a pivot assembly pivotally mounted to the frame. The pivot assembly is movable between a first pivot position where a portion of the pivot assembly extends below the main frame, to a second pivot position, where the pivot assembly is generally above the main frame. The pivot assembly includes a mount platform positioned below the main frame when the pivot assembly is in the first pivot position and a slewing bearing mounted on the mount platform. The pivot assembly includes a carrier mechanism that is rotatably mounted to the slewing bearing. The carrier mechanism is configured to be rotated generally parallel to the mount platform via the slewing bearing. The material processing unit includes a discharge conveyor that is pivotally mounted to the carrier mechanism. The discharge conveyer is configured to receive material from the collecting conveyor.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
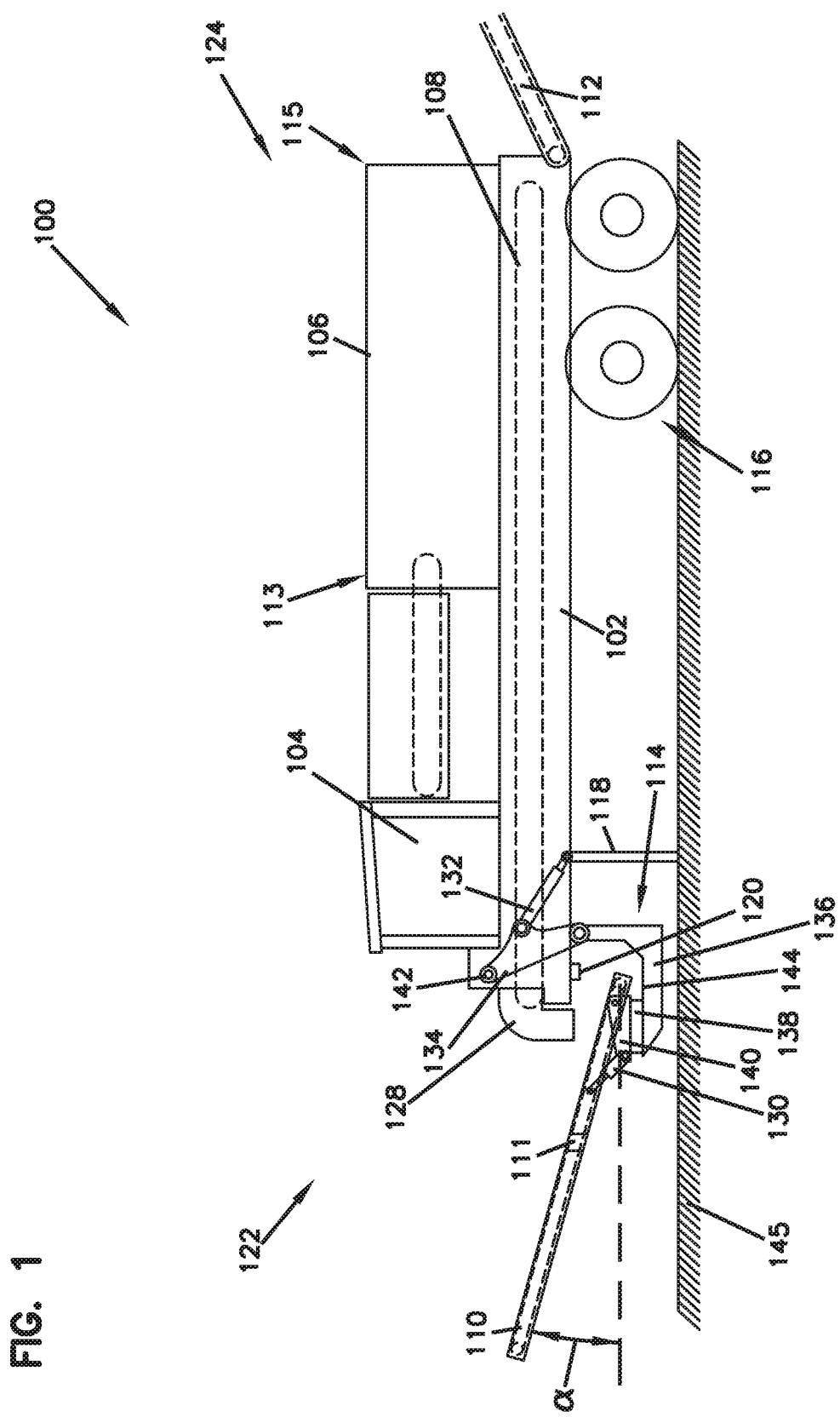
FIG. 1 illustrates a schematic side view of a screening machine with a discharge conveyor pivot assembly in a first pivot position, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The discharge conveyor mounting system disclosed herein will be described with respect to a mobile screening machine. However, the discharge conveyor system mounting system can be utilized in a variety of different applications where it is advantageous to have a stowable pivoting conveyor, specifically on mobile material-separation machinery, such as a trommel screen system.

The discharge conveyor mounting system disclosed herein has several advantages. The discharge conveyor mounting system is configured to provide a pivoting mounting arrangement so that the discharge conveyor can be rotated horizontally, pivoted vertically, and radially stacked for stowing. Further, the discharge conveyor allows for the minimizing of a height of an inlet hopper so that loading of material into the hopper is eased. The discharge conveyor also can also be entirely supported by a main frame of the screening machine, thereby eliminating any need of additional support structure on the discharge conveyor itself. This makes it easier for the operator to move the discharge conveyor into a position for stowing while also providing a more reliable operation.

Figure 2:
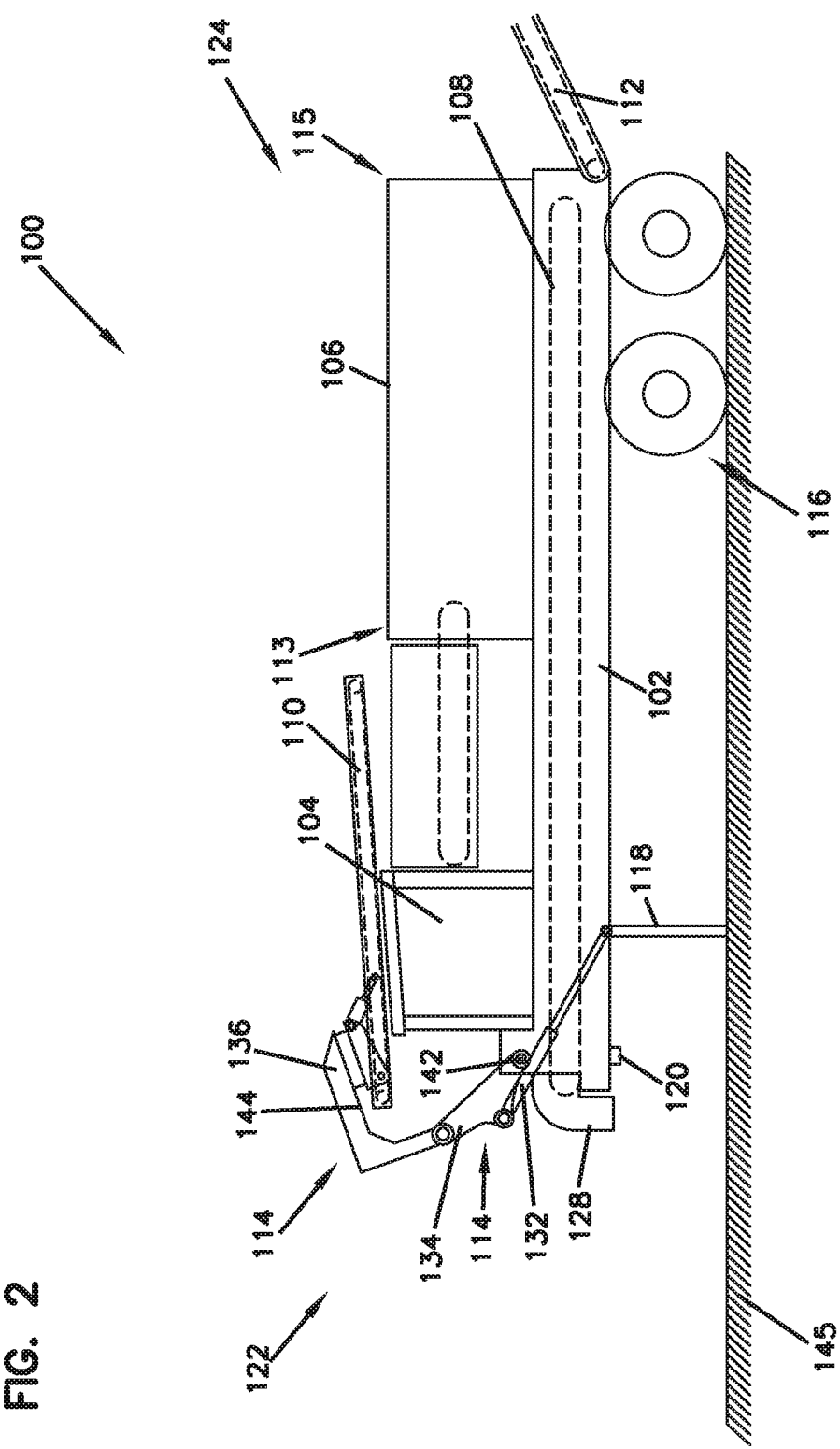
FIG. 2 illustrates a schematic side view of the screening machine of FIG. 1 with the discharge conveyor pivot assembly in a second pivot position.
Figure 3:
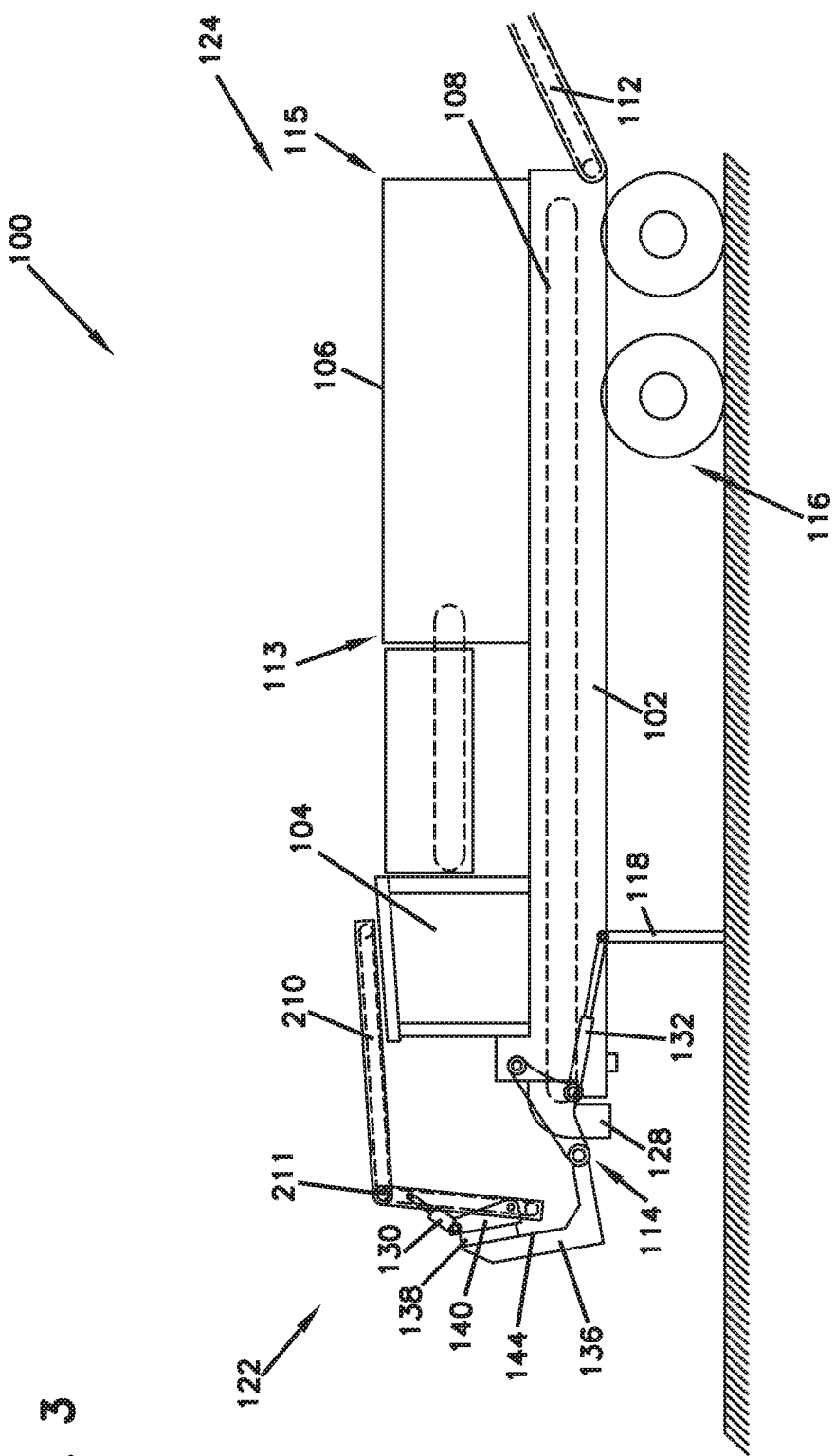
FIG. 3 illustrates a schematic side view of the screening machine of FIG. 1 with the discharge conveyor pivot assembly in a second pivot position and having a foldable discharge conveyor.

FIGS. 1-3 show a schematic of a screening machine 100, according to one embodiment of the present disclosure. The screening machine 100 includes a main frame 102, a power system 104, a rotary trommel screen 106, an inlet hopper 107, a collecting conveyor 108, an inlet hopper conveyor 109 a discharge conveyor 110, an auxiliary discharge conveyor 112, and a discharge conveyor pivot assembly 114.

The screening machine 100 is configured to separate an unconsolidated material into separate consolidated products (e.g., based on component sizing) delivered to the trommel screen 106 via the discharge conveyor 110 and auxiliary discharge conveyor 112.

In the depicted example, the screening machine is mobile and includes a plurality of wheels and axles 116. The specific number of wheels and axles 116 being dependent on the overall size and weight of the screening machine 100. In some examples, the screening machine 100 includes stabilizing elements 118 configured to stabilize the screening machine 100 during stationary operation. Also, in some examples, the screening machine 100 is configured to be transported on public roadways by a towing vehicle via a tow hitch 120 mounted to the underside of the main frame 102. In some examples, the screening machine 100 is configured to be transported on public roadways by a towing vehicle. In other examples, the screening machine 100 can be stationary and not include wheels and axles 116 so as to remain at one location for an extended period of time.

The main frame 102 includes a proximal end 122 and a distal end 124. The main frame 102 is configured to support at least the trommel screen 106. However, in other examples, the main frame 102 is configured to support multiple components of the screening machine 100. In some examples, the discharge conveyor 110 is mounted via the discharge conveyor pivot assembly 114 at the proximal end 122 of the main frame 102. In some examples, the tow hitch 120 is mounted to the underside of proximal end 122 of the main frame 102. In some examples, the stabilizing element 118 is attached to the main frame 102. In other examples still, the wheel and axles 116 are mounted to the underside of the distal end 124 of the main frame 102.

The power system 104 provides power to the screening machine 100 during operation. In some examples, the power system 102 includes an engine. In some examples, the power system 104 is an electric power system. In some examples, the power system includes a fuel cell such as a battery. In other examples, the power system is a diesel engine. In addition, the power system 104 includes a hydraulic system. In some examples, the power system 104 and the screening machine 100, in their entirety, are operable remotely or by a control panel that is in communication with the power system 104. It is to be understood that the power system 104 could be carried on the main frame 102 or could be in the form of the engine of the pulling vehicle (e.g., hydraulic connections to the engine of the pulling vehicle being able to provide the drive to power the screening machine 100).

The rotary trommel screen 106 is configured to receive and filter unconsolidated material. In some examples, the rotary trommel screen 106 includes a plurality of screen portions 127. In some embodiments, the rotary trommel screen 106 is generally cylindrical in shape. In general, the rotary trommel screen 106 is configured to separate smaller material from larger material. During operation, the rotary trommel screen 106 rotates about a longitudinal axis, which causes material contained within the rotary trommel screen 106 to be stirred and sifted. Additionally, in some embodiments, the rotary trommel screen 106 is mounted so that the rotary trommel screen 106 slopes downward from an inlet 113 to an outlet 115.

The inlet hopper 107 and inlet hopper conveyor 109 provide a deposit area for material. Once collected within the hopper, the inlet hopper conveyor 109 moves material to the inlet for the rotary trommel screen 106. The inlet hopper 107 and inlet hopper conveyor 109 are arranged so that the collecting conveyor runs underneath the inlet hopper 107. Maintaining a reasonable height so that it is not overly difficult to load material into the inlet hopper 107 is important and achieved by the positioning of the discharge conveyor 110.

The collecting conveyor 108 is configured to move product away from underneath the rotary trommel screen 106. The collecting conveyor 108 is positioned underneath, and longitudinally, with respect to the rotary trommel screen 106. Further, the collecting conveyer 108 is operated in a generally parallel manner with respect to the rotary trommel screen 106. In the depicted examples, the collecting conveyor 108 is configured to move in a direction toward the proximal end 122 of the main frame 102. In some examples, the collecting conveyor 108 includes a collecting conveyor exit 128 positioned proximate to the proximate end 122 of the main frame 102. In some examples, the collecting conveyor 108 moves a first product (e.g., a fine product) to the discharge conveyor 110 via the collecting conveyor exit 128. In some embodiments, the collecting conveyor 108 is a belt conveyor.

The discharge conveyor 110 is pivotably mounted to the main frame 102 via the discharge conveyor pivot assembly 114. The discharge conveyor 110 is configured to move a product to a discharge location away from the screening machine 100. In some examples, the discharge conveyor 110 is a belt conveyor. In some examples, the discharge conveyor 110 is a non-folding conveyor. In other examples, as shown in FIG. 3, the discharge conveyor 110 is a folding conveyor.

In some examples, the discharge conveyor 110 can be positioned longitudinally with respect to the main frame 102, or pivoted and positioned in a skewed position with respect to the main frame 102 via the discharge conveyor pivot assembly 114. This positioning will be discussed in more detail with respect to FIGS. 8-11.

In some examples, the discharge conveyor 110 can be positioned at a variety of different positions with a ground surface 145. The discharge conveyor 110 can be angled at an angle α with a portion of the discharge conveyor pivot assembly 114 between horizontal and a maximum angled position. In some examples, the angle α is between about 0 degrees and about 45 degrees. In other embodiments, the angle α is between about 0 degrees and about 25 degrees.

In some examples, the angle α of the discharge conveyor 110 can be adjusted by at least one discharge conveyor lift cylinder 130. The adjustable discharge conveyor lift cylinder 130 is connected to the discharge conveyor 110 and to the discharge conveyor pivot assembly 114. The adjustable discharge conveyor lift cylinder 130 is configured for selectably adjusting the angle α of the discharge conveyor 110 with a portion of the discharge conveyor pivot assembly 114.

In some examples, the discharge conveyor 110 can include a sensor 111 to determine the positing of the discharge conveyor 110. In some examples, the sensor 111 is a gyroscope.

The auxiliary discharge conveyor 112 is configured to move a second product to a discharge location away from the screening machine 100. In some examples, the auxiliary discharge conveyor 112 is positioned longitudinally with respect to the main frame 102. In some embodiments, the auxiliary discharge conveyor 112 is a belt conveyor.

The discharge conveyor pivot assembly 114 includes at least one lift cylinder 132, at least one pivoting arm 134, a mount platform 136, a swivel mount 138, and a carrier mechanism 140.

The discharge conveyor pivot assembly 114 is configured to both pivot the discharge conveyer 110 vertically about the main frame 102 as well as horizontally about the main frame 102. The discharge conveyor pivot assembly 114 is movable between a first pivot position and a second pivot position. As shown in FIG. 1, in the first pivot position, a portion of the discharge conveyor pivot assembly 114 extends below the main frame 102. Further, in the first positon, the discharge conveyor 110 is supported entirely by the discharge conveyor pivot assembly 114 and no other supporting means. As shown in FIG. 2, in the second pivot position, the pivot assembly 114 is generally positioned above the main frame 102.

The lift cylinder 132 and the pivoting arm 134 are attached to the main frame 102. The mount platform 136 is connected to the pivoting arm 134, and the carrier 140 is connected to the mount platform 136 via the swivel mount 138. In some examples, the screening machine 100 includes a second pivoting arm and lift cylinder at an opposite side of the screening machine 100 (as shown in FIGS. 4-11).

The lift cylinder 132 is configured to drive the vertical pivoting movement of the discharge conveyor pivot assembly 114 between the first and second pivot positions. The lift cylinder 132 is an adjustable cylinder that is anchored to the main frame 102 and to the pivoting arm 134. When moving between the first and second pivot positions, the lift cylinder is extended, as shown in FIG. 2, and shortened, as shown in FIG. 1. In some examples, the lift cylinder 132 is a hydraulic cylinder. In other examples, the lift cylinder 132 is a pneumatic cylinder.

The pivoting arm 134 is pivotally connected to the main frame 102 at a first pivot point 142 and also connected to the lift cylinder 132 and the mount platform 136. As the lift cylinder 132 extends and shortens, the pivoting arm 134 pivots about pivot point 142. In some examples, the mount platform 136 is non-pivotally connected to the pivoting arm 134, so as the pivoting arm 134 moves, the mount platform 136 moves. In some examples, the pivoting arm 134 is sized so that, when in the pivot position, the pivoting arm 134 positions the mount platform 136 below the main frame 102, as shown in FIG. 1, and above the main frame 102, as shown in FIG. 2.

The mount platform 136 is connected to the pivoting arm 134 and also the swivel mount 138. The mount platform 136 is positioned below the main frame 102 when the pivot assembly 114 is in the first pivot position. The mount platform 136 positions the discharge conveyor 110 in line with the conveyor exit 128, so that the discharge conveyor 110 can deposit material at a location away from the screening machine 100. Such positioning of the mount platform 136 below the main frame 102 allows the discharge conveyor 110, which is attached via the carrier 140 and the swivel mount 138 to the mount platform 136, to be positioned in close proximity to the ground surface 145. This is advantageous in windy conditions, as the discharge conveyor 110 can be positioned close to the ground surface 145 to reduce the distance that material must travel from the end of the discharge conveyor 110 to a pile on the ground so as to reduce the chance the material is blown by the wind.

In some examples, the mount platform 136 is positioned proximate, but above, a ground surface 145 when in the first pivot position. In other examples, the mount platform 136 is configured to rest on the ground surface 145 when in the first pivot position. When in the second pivot position, the mount platform 136 is positioned generally above the main frame 102. The mount platform 136 provides a shelf 144 that can be positioned generally parallel to the ground surface 145 when in the first pivot position for mounting the swivel mount 138.

The swivel mount 138 is mounted to the mount platform 136 and to the carrier 140 so as to allow the discharge conveyor 110 to pivot horizontally about the mount platform 136, and therefore about the main frame 102. The swivel mount 138 can have a variety of different constructions. In some examples, the swivel mount 138 can have a ball joint construction. In other examples, the swivel mount 138 can be a slewing bearing. In other examples still, the swivel mount 138 can be a powered swivel mount 138 so that the rotation of the discharge conveyor 110 can be controlled remotely.

The carrier 140 is connected to the swivel mount 138 so as to allow the carrier 140 to pivot along a generally horizontal parallel plane with respect to the mount platform 136. The discharge conveyor 110 is attached to the carrier 140. In some examples, the discharge conveyor 110 can be angled with the carrier at the angle α. In some examples, the at least one discharge conveyor lift cylinder 130 is mounted to the carrier 140. In other examples, a second conveyor lift cylinder 130 is mounted to the carrier 140, opposite the at least one discharge conveyor lift cylinder 130.

As shown in FIG. 2, when in the second pivot position, the discharge conveyor pivot assembly 114 and the discharge conveyor 110 are in a storage position above the main frame 102 of the screening machine 100. In some examples, the discharge conveyor 110 is at least partially positioned above the trommel screen 106. In some examples, the discharge conveyor 110, the mount platform 136, the swivel mount 138, and the carrier 140 are inverted when stored in the second pivot position. In some examples, when in the second pivot position, the discharge conveyor pivot assembly 114, along with the discharge conveyor 110, are positioned in a way so as to not interfere with the tow hitch 120 to facilitate attaching the tow hitch 120 to a towing vehicle.

FIG. 3 shows a discharge conveyor 210, according to another embodiment of the present disclosure. The discharge conveyor 210 is a folding conveyor having an elbow 211. The elbow 211 is a joint that allows the discharge conveyor 210 to fold. In the example shown in FIG. 3, the discharge conveyor 210 is folded at the elbow 211 so that the discharge conveyor pivot assembly 114 is not rotated and inverted as much and when compared to the example shown in FIG. 2. When the screening machine 100 includes the discharge conveyor 210, the discharge conveyor 210 can be unfolded so as to extend along a single plane when in the first pivot position. In other examples, the discharge conveyor 210 can be operated in the first pivot position in a folded orientation. In some examples, the folding and unfolding of the discharge conveyor 210 can be controlled remotely.

Figure 4:
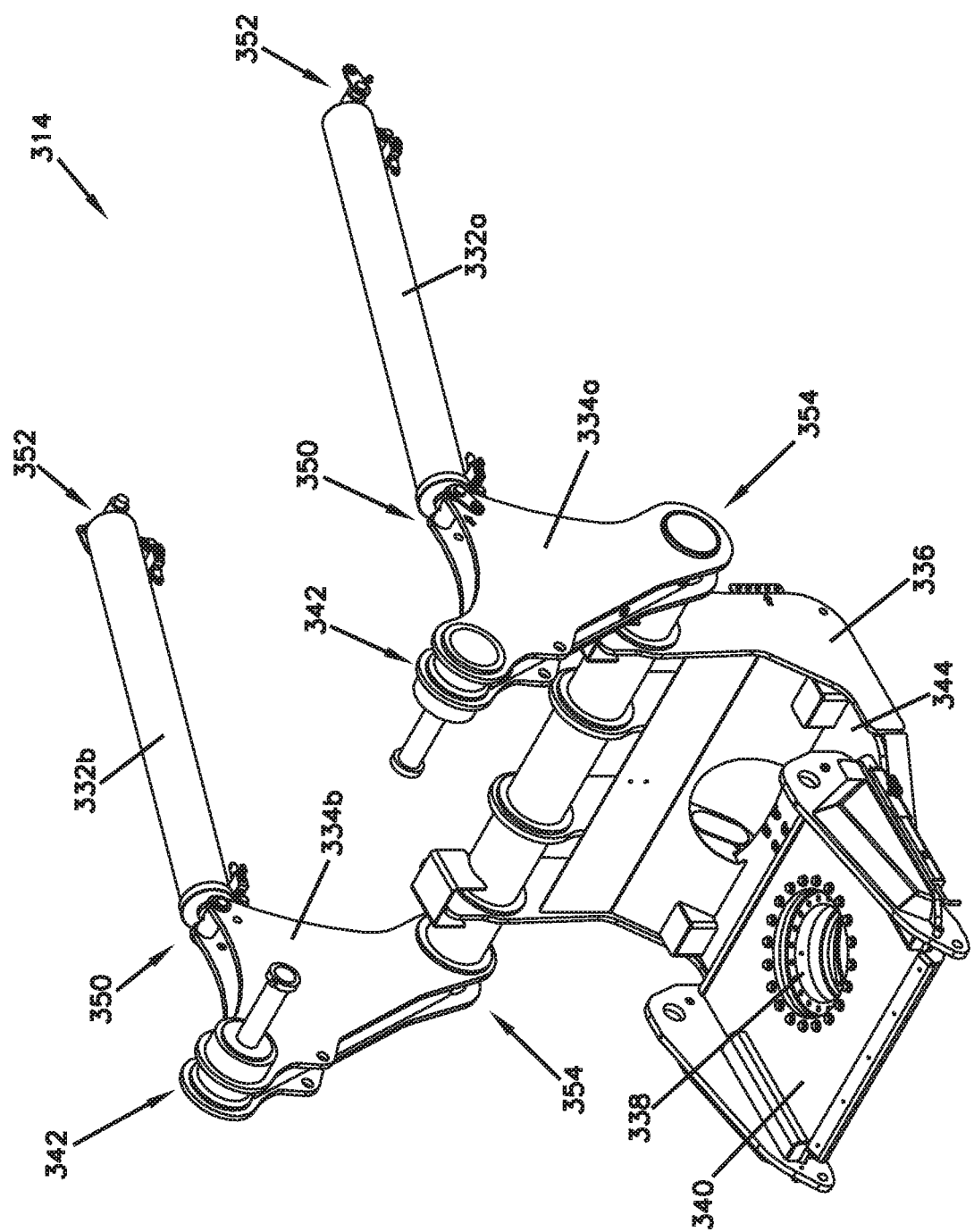
FIG. 4 illustrates a perspective view of a discharge conveyor pivot assembly, according to one embodiment of the present disclosure.

FIG. 4 shows a discharge conveyor pivot assembly 314 according to one embodiment of the present disclosure. The discharge conveyor pivot assembly 314, is substantially similar to, and operates in a similar manner as, the discharge conveyor pivot assembly 114. Accordingly, the discharge conveyor pivot assembly 314 includes a pair of lift cylinders 332a, 332b, a pair of pivoting arms 334a, 334b, a mount platform 336, a swivel mount 338, and a carrier mechanism 340.

The lift cylinders 332a, 332b are extendable cylinders each pivotally attached to the pivoting arms 334a, 334b at first ends 350 and connectable to a main frame (not shown) at second ends 352. In some examples, the lift cylinders 332a, 332b are remotely operable via hydraulic or pneumatic means so as to drive the vertical pivotal movement of the discharge conveyor pivot assembly 314 about the main frame.

The pivoting arms 334a, 334b are each pivotally connected to the main frame at pivot points 342. The pivoting arms 334a, 334b are also each rigidly attached to the mount platform 336 at an end 354 opposite pivot points 342. The pivoting arms 334a, 334b can have a variety of different shapes and configurations.

The mount platform 336 is rigidly attached to the pivoting arms 334a, 334b. In some examples, the pivoting arms 334a, 334b are welded to the mount platform 336. The mount platform 336 includes a shelf 344 which provides a surface for mounting the swivel mount 338 and carrier 340.

The swivel mount 338 is mounted to the shelf 344 of the mount platform 336 and the also attached to the carrier 340 so as to allow the carrier 340 to pivot about a horizontal plane generally parallel with the shelf 344. In the depicted example, the swivel mount 338 is a slewing ring (also known as a slewing bearing or a slew ring). The swivel mount 338 will be discussed in more detail with respect to FIG. 7.

The carrier 340 is attached to the swivel mount 338 and provides a mounting location for a discharge conveyor (not shown), substantially similar to the discharge conveyers 110, 210 shown in FIGS. 1-3. The carrier 340 transfers any load created by the position of the discharge conveyor to the swivel mount 338. The carrier 340 and the swivel mount 338 are configured to support the at least a portion of the load of a discharge conveyor while it is positioned in space. In some examples, the discharge conveyor pivot assembly 314 is configured to support the entire load of the discharge conveyor, no matter what position the discharge conveyor is in.

Figure 5:
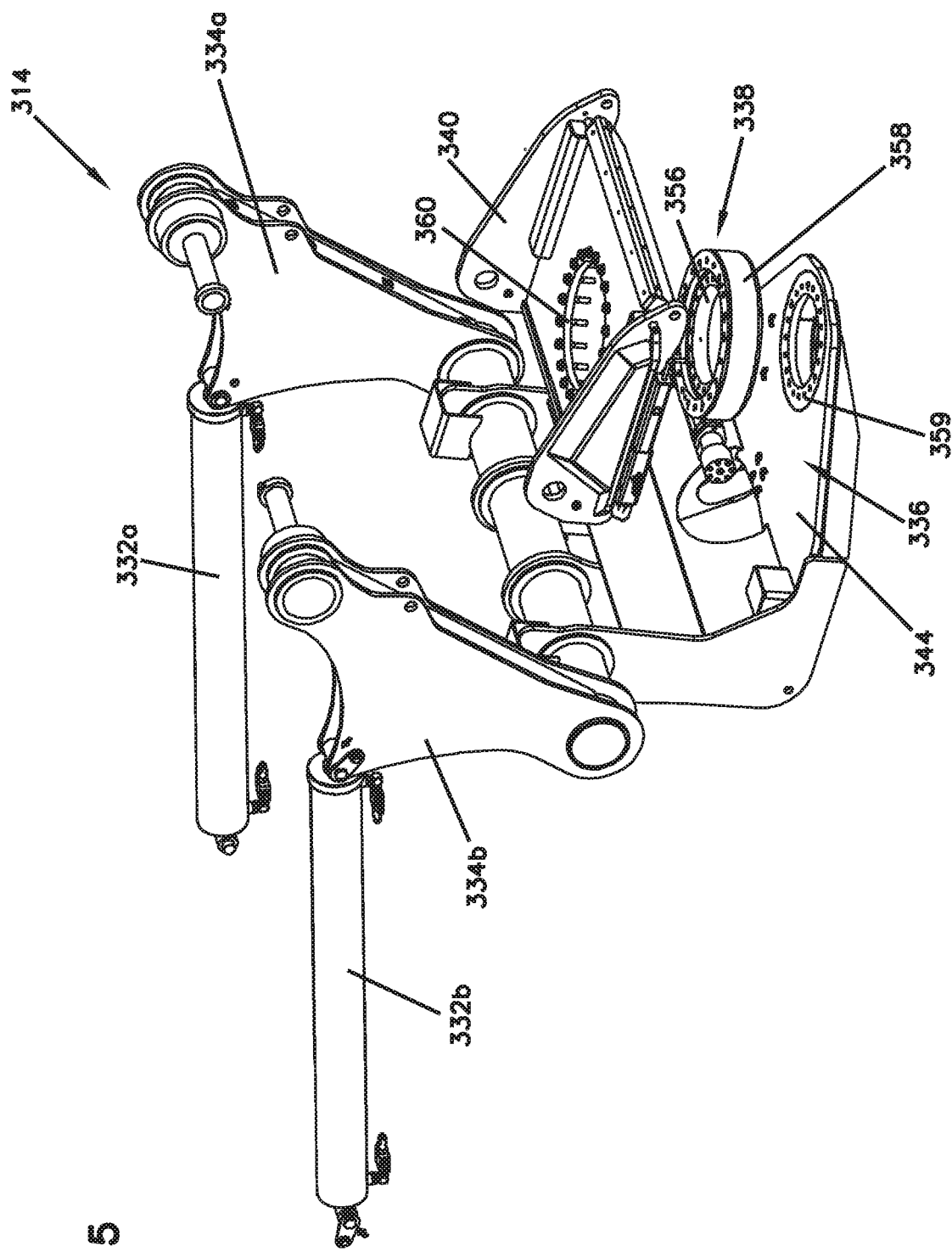
FIG. 5 illustrates a partially exploded perspective of view the discharge conveyor pivot assembly of FIG. 4.
Figure 6:
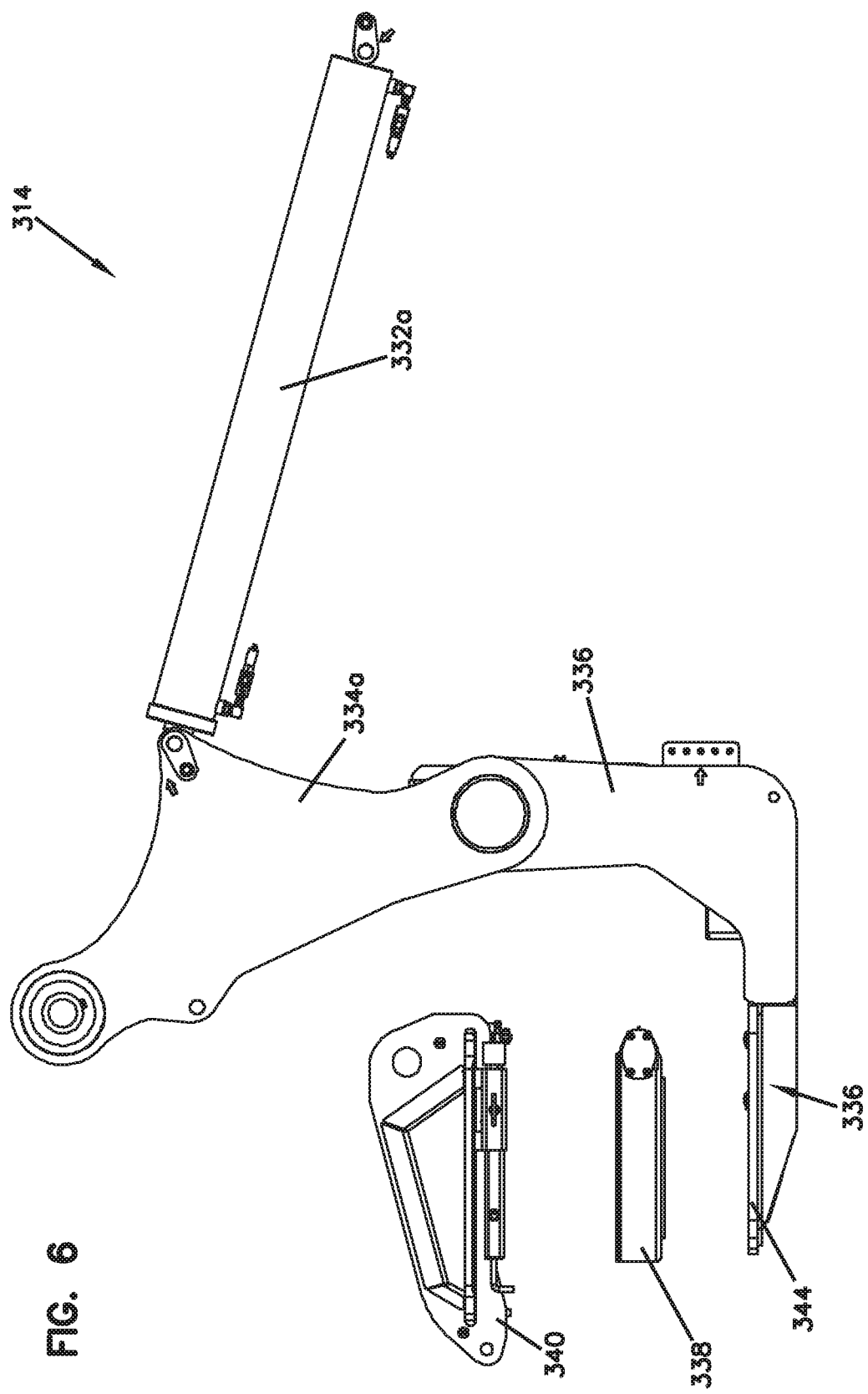
FIG. 6 illustrates a partially exploded side view of the discharge conveyor pivot assembly of FIG. 4.

FIGS. 5-6 show a partially exploded view of the discharge conveyor pivot assembly 314. As shown, the swivel mount 338 has a first body 356 positioned within a second body 358. The mount platform 336 includes a flange 359 for attaching the first body 356 of the swivel mount 338 to the mount platform 336. The carrier 340 includes a flange 360 for attaching the second body 358 of the swivel mount 338 to the carrier 340.

Figure 7:
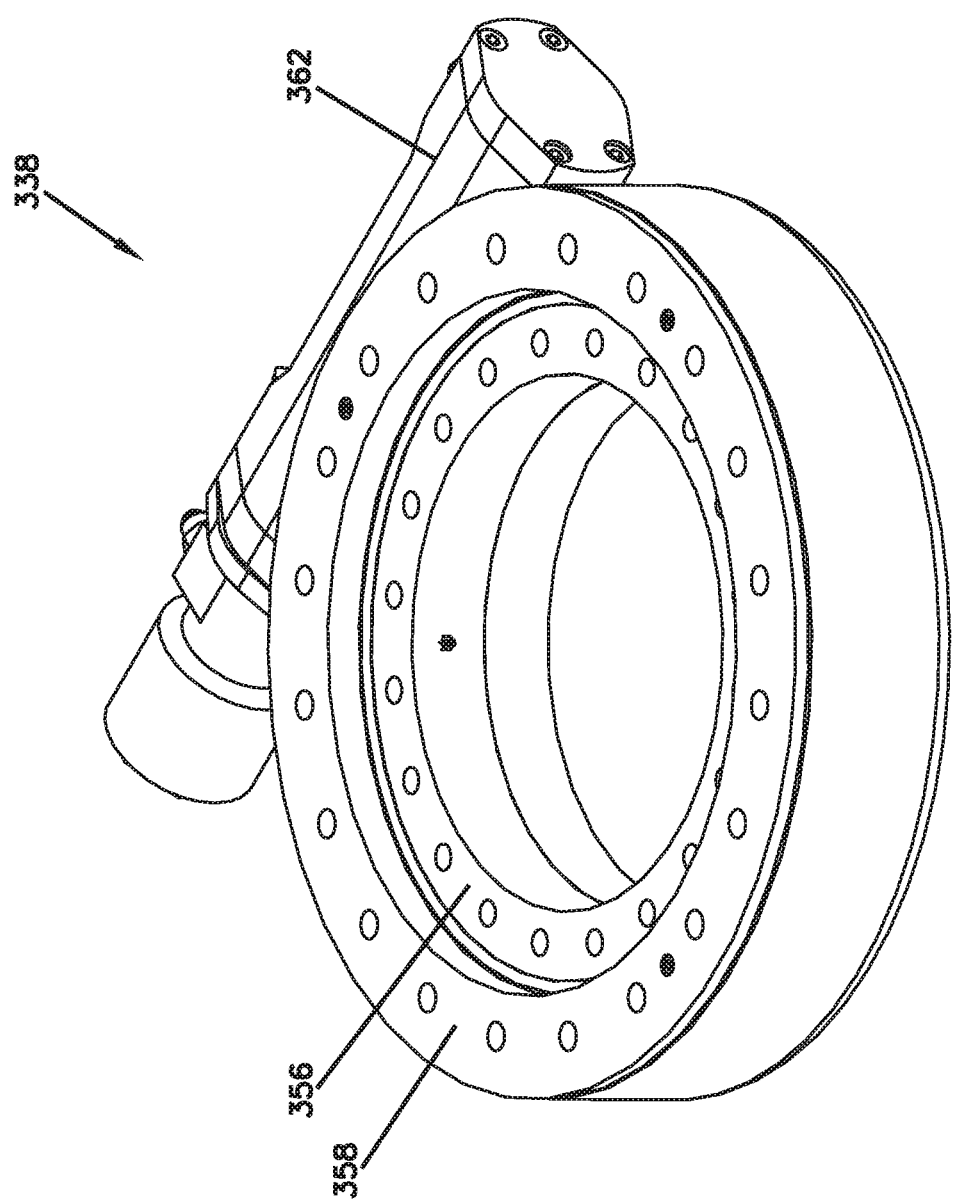
FIG. 7 illustrates a perspective view of a swivel mount of the discharge conveyor pivot assembly of FIG. 4.

FIG. 7 shows a perspective view of the swivel mount 338. As noted above, the swivel mount 338 is a slewing bearing with the first body 356 positioned within the second body 358. In some examples, the swivel mount 338 includes a plurality of rolling elements (i.e., ball bearings) positioned between the first body 356 and the second body 358 so as to promote relative rotation between the two bodies. In other examples, a bushing, or bushing element, is positioned between the first body 356 and the second body 358.

In some examples, the swivel mount 338 can be driven via a drive element 362. In the depicted example, the drive element 362 is configured to drive the second body 358. In other examples, the drive element 362 can be positioned to drive the first body 356. The drive element 362 can include a plurality of teeth to engage teeth on the second body 358. Power can be provided to the drive element 362 via hydraulic fluid or electricity.

Figure 8:
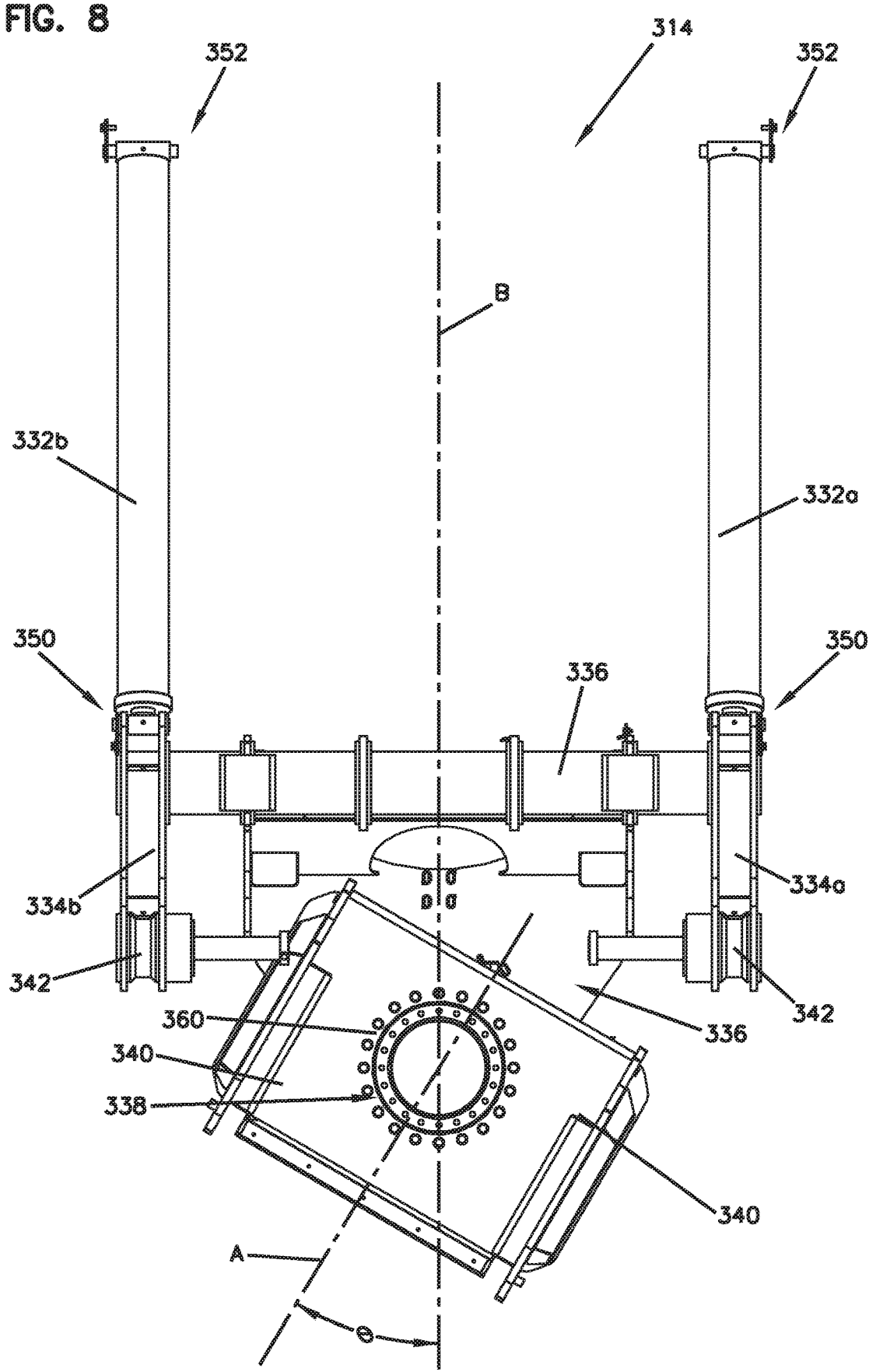
FIG. 8 illustrates a top view of the discharge conveyor pivot assembly of FIG. 4 with a carrier pivoted in a first direction.
Figure 9:
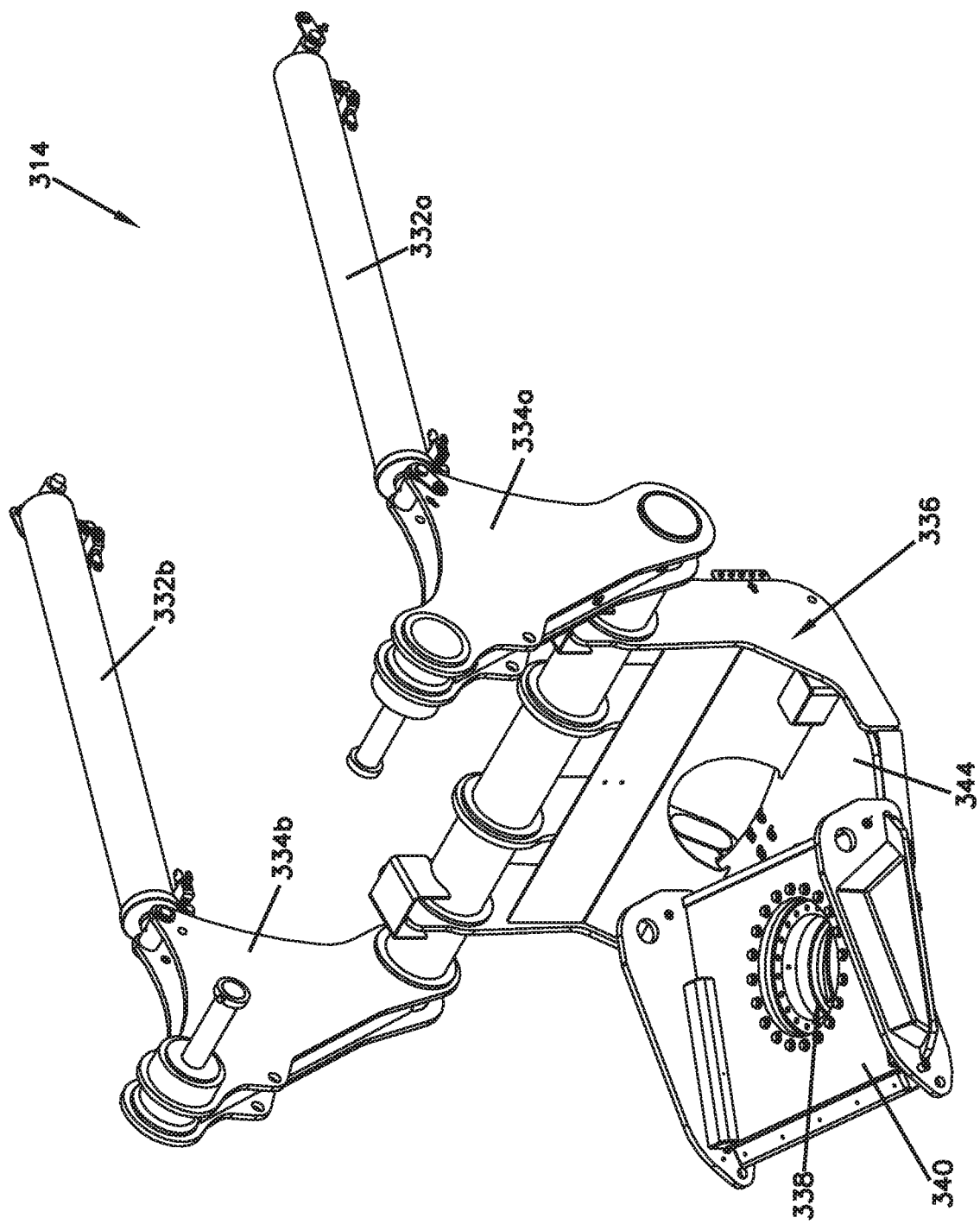
FIG. 9 illustrates a perspective view of the discharge conveyor pivot assembly of FIG. 4 with a carrier pivoted in the first direction.
Figure 10:
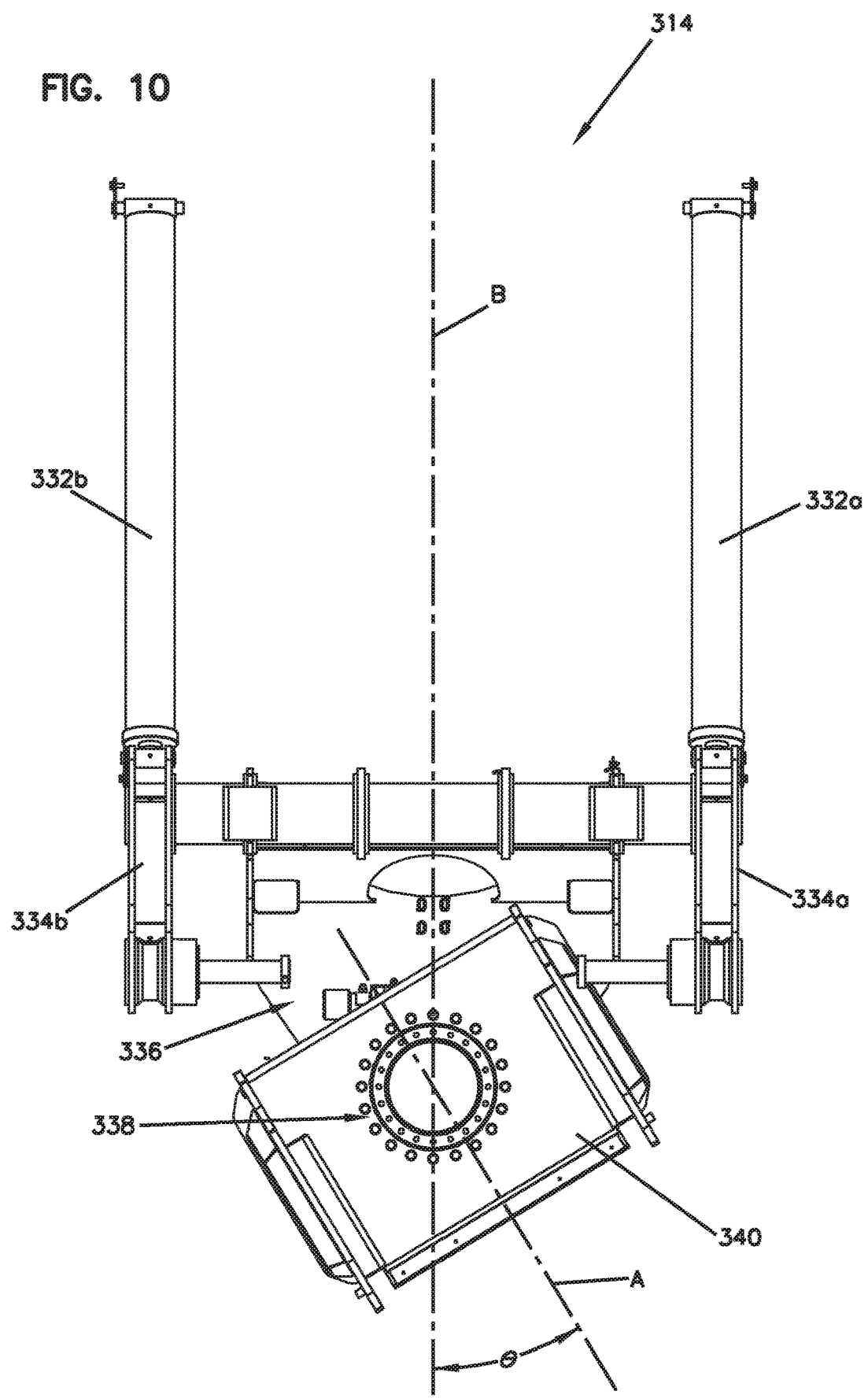
FIG. 10 illustrates a top view of the discharge conveyor pivot assembly of FIG. 4 with a carrier pivoted in a second direction.
Figure 11:
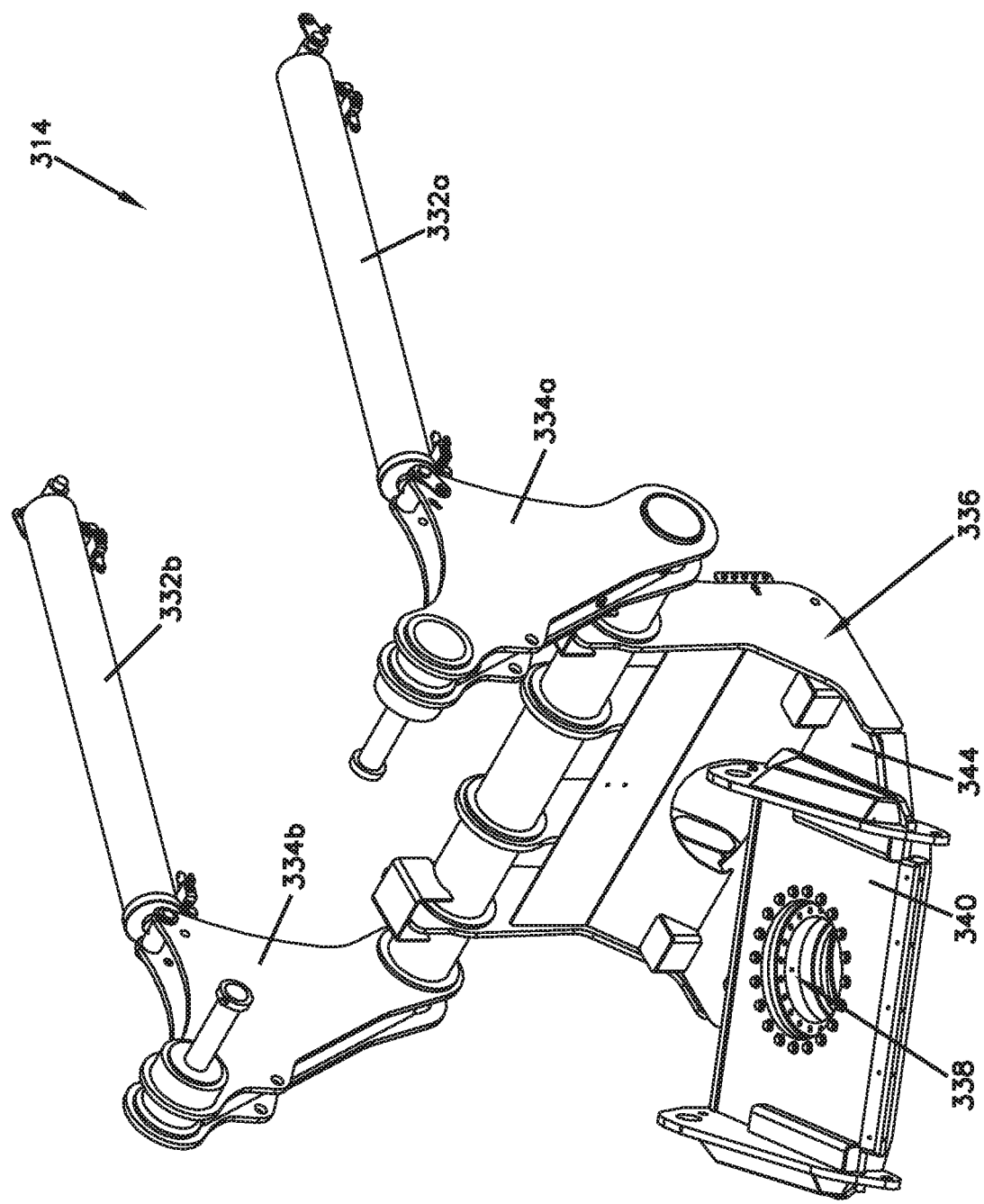
FIG. 11 illustrates a perspective view of the discharge conveyor pivot assembly of FIG. 4 with a carrier pivoted in the second direction.

FIGS. 8-11 show the carrier 340 in a variety of different rotated positions. In FIGS. 8-9, the carrier 340 is shown rotated in a first direction. In FIGS. 10-11, the carrier 340 is shown rotated in a second, opposite direction.

The carrier 340 has a longitudinal axis A, and the discharge conveyor pivot assembly 314 has a longitudinal axis B. In some examples, the longitudinal axis A and the longitudinal axis B are aligned. In other examples, the longitudinal axis A of the carrier 340 can be rotated at an angle θ in either the first or second direction from the longitudinal axis B of the discharge conveyor pivot assembly 314. In some examples, angle θ is between about 0 degrees and about 90 degrees thereby allowing about 180 degrees of motion.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

I claim:

1. A material processing unit comprising:
a main frame;
a pivot assembly pivotally mounted to the main frame, the pivot assembly being movable between a first pivot position, where a portion of the pivot assembly extends below the main frame, to a second pivot position, where the pivot assembly is generally above the main frame, the pivot assembly including:
a mount platform being below the main frame when the pivot assembly is in the first pivot position;
a slewing bearing mounted on the mount platform;
a carrier mechanism rotatably mounted to the slewing bearing, the carrier mechanism being configured to be rotated generally parallel to the mount platform via the slewing bearing; and
a discharge conveyor pivotally mounted to the carrier mechanism.

2. The material processing unit of claim 1, wherein the main frame defines a proximal frame end and a distal frame end, the pivot assembly being pivotally mounted to the main frame at the proximal frame end.

3. The material processing unit of claim 2, wherein the proximal frame end includes a tow hitch on a bottom side thereof, the tow hitch being configured to promote connection of the material processing unit to a towing vehicle, and wherein a portion of the pivot assembly extends below both the main frame and the tow hitch in the first pivot position.

4. The material processing unit of claim 2, wherein the distal frame end has a plurality of tires rotatably mounted to a bottom side thereof.

5. The material processing unit of claim 1, further comprising a collecting conveyor carried by the main frame, the collecting conveyor extending along a top side of the main frame, the collecting conveyer having a collecting conveyor exit associated therewith.

6. The material processing unit of claim 5, wherein the collecting conveyor exit is proximate a proximal frame end.

7. The material processing unit of claim 5, wherein the slewing bearing is located directly below the collecting conveyor exit when the pivot assembly is in the first pivot position.

8. The material processing unit of claim 5, wherein the mount platform is positioned below and generally vertically in-line with the collecting conveyor exit when the pivot assembly is in the first pivot position.

9. The material processing unit of claim 5, wherein the discharge conveyor defines a first discharge conveyor end and a second discharge conveyor end, the first discharge conveyor end being pivotally mounted to the carrier mechanism, the second discharge conveyor end defining a free conveyor end, the free conveyor end being configured to off-load material therefrom.

10. The material processing unit of claim 9, wherein the discharge conveyor is non-foldable, the first discharge conveyor end being generally vertically in-line with the collecting conveyor exit when the pivot assembly is in the first pivot position, the discharge conveyor being fully supported by the main frame.

11. The material processing unit of claim 1, further comprising an adjustable discharge conveyor lift cylinder, the adjustable discharge conveyor lift cylinder being connected to the discharge conveyor and the carrier mechanism, the adjustable discharge conveyor lift cylinder being configured for selectably adjusting an angle between the carrier mechanism and the discharge conveyor.

12. The material processing unit of claim 11, further comprising a pivot assembly lift cylinder mounted to the main frame and the pivot assembly, the pivot assembly lift cylinder being configured to selectably move the pivot assembly between the first pivot position and the second pivot position, the discharge conveyor being positioned in a storage location above the main frame when the pivot assembly is in the second pivot position, the pivot assembly lift cylinder being different from the adjustable discharge conveyor lift cylinder.

13. The material processing unit of claim 1, wherein the material processing unit is a trommel screen machine.

14. The material processing unit of claim 1, further comprising at least one sensor configured to determine the position of the discharge conveyor.

15. A material processing unit comprising:
a main frame defining a proximal frame end and a distal frame end;
a collecting conveyor carried by the main frame, the collecting conveyor having a collecting conveyor exit, the collecting conveyor exit being proximate the proximal frame end;
a pivot assembly pivotally mounted to the main frame, the pivot assembly being movable between a first pivot position, where a portion of the pivot assembly extends below the main frame, to a second pivot position, where the pivot assembly is generally above the main frame, the pivot assembly including;
a mount platform being positioned below the main frame when the pivot assembly is in the first pivot position;
a swivel mount mounted on the mount platform; and
a non-folding discharge conveyor pivotally mounted to the swivel mount, the discharge conveyor being fully carried by the main frame when the pivot mount assembly is both in the first pivot position and in the second pivot position.

16. The material processing unit of claim 15, wherein the pivot assembly further includes a carrier mechanism rotatably mounted to the swivel mount, the carrier mechanism being configured to be rotated generally parallel to a portion of the mount platform via the swivel mount, and wherein the discharge conveyer is mounted to the swivel mount via the carrier mechanism.

17. The material processing unit of claim 16, wherein the carrier mechanism further includes a discharge conveyor lift cylinder, the discharge conveyor lift cylinder being configured to selectably adjust an angle of the discharge conveyor relative to the carrier mechanism.

18. The material processing unit of claim 16, wherein the discharge conveyor defines a first discharge conveyor end and a second discharge conveyor end, the first discharge conveyor end being pivotally mounted to the carrier mechanism, the second discharge conveyor end defining a free conveyor end, the free conveyor end being configured to off-load material therefrom.

19. A material processing unit comprising:

a main frame;

a rotary trommel screen having an inlet end and an outlet end and being rotatably attached to the main frame;

a collecting conveyor positioned under the rotary trommel screen, the collecting conveyor being configured to move product away from underneath the rotary trommel screen;

a pivot assembly pivotally mounted to the main frame, the pivot assembly being movable about a pivot point between a first pivot position, where a portion of the pivot assembly extends below the main frame, to a second pivot position, where the pivot assembly is generally above the main frame, the pivot assembly including:

a mount platform being below the main frame when the pivot assembly is in the first pivot position and above the main frame when the pivot assembly is in the second pivot position;

a slewing bearing mounted on the mount platform;

a carrier mechanism rotatably mounted to the slewing bearing, the carrier mechanism being configured to be rotated generally parallel to the mount platform via the slewing bearing; and a discharge conveyor, the entire discharge conveyor being pivotally mounted to the carrier mechanism, the discharge conveyer being configured to receive material from the collecting conveyor, the mount platform being disposed between the pivot point and the discharge conveyor.

20. The material processing unit of claim 19, wherein the discharge conveyor defines a first discharge conveyor end, and a second discharge conveyor end, the first discharge conveyor end being pivotally mounted to the carrier mechanism, the second discharge conveyor end defining a free conveyor end, the free conveyor end being configured to off-load material therefrom.

* * * * *